United States Patent
Vidyadhara et al.

(10) Patent No.: US 10,423,425 B2
(45) Date of Patent: Sep. 24, 2019

(54) SYSTEM AND METHOD FOR RUNTIME UPDATE OF ESRT TABLE FOR HOT-PLUGGABLE DISKS

(71) Applicant: DELL PRODUCTS, LP, Round Rock, TX (US)

(72) Inventors: Sumanth Vidyadhara, Bangalore (IN); Raveendra Babu Madala, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 425 days.

(21) Appl. No.: 15/180,521

(22) Filed: Jun. 13, 2016

(65) Prior Publication Data
US 2017/0357500 A1     Dec. 14, 2017

(51) Int. Cl.
| | |
|---|---|
| *G06F 8/654* | (2018.01) |
| *G06F 9/4401* | (2018.01) |
| *G06F 13/40* | (2006.01) |
| *G06F 13/24* | (2006.01) |
| *G06F 13/42* | (2006.01) |
| *G06F 8/656* | (2018.01) |

(52) U.S. Cl.
CPC ............ *G06F 9/4406* (2013.01); *G06F 8/656* (2018.02); *G06F 9/4411* (2013.01); *G06F 13/24* (2013.01); *G06F 13/4081* (2013.01); *G06F 13/4282* (2013.01); *G06F 2213/0026* (2013.01)

(58) Field of Classification Search
CPC ........ G06F 8/654; G06F 8/65; G06F 9/45558; G06F 9/4401; G06F 9/4411
USPC .......................................................... 710/302
See application file for complete search history.

(56) References Cited

U.S. PATENT DOCUMENTS

| | | | |
|---|---|---|---|
| 8,510,422 B2 | 8/2013 | Phung et al. | |
| 2003/0005200 A1 | 1/2003 | Kumar et al. | |
| 2009/0210689 A1* | 8/2009 | Harmer ................. | G06F 9/4401 713/2 |
| 2009/0327679 A1* | 12/2009 | Huang .................. | G06F 9/4406 713/2 |
| 2010/0082932 A1* | 4/2010 | Rothman ................. | G06F 8/65 711/166 |

(Continued)

OTHER PUBLICATIONS

"Windows UEFI Firmware Update Platform," Microsoft Corporation, Apr. 4, 2013; pp. 1-45.

*Primary Examiner* — Titus Wong
(74) *Attorney, Agent, or Firm* — Larson Newman, LLP (57) ABSTRACT

An information handling system includes a memory, a remote access controller, and a host processor. The memory to store an extensible firmware interface (EFI) system resource table (ESRT) and an ESRT capsule. The remote access controller to detect an insertion of a hot-pluggable device into the information handling system, to retrieve firmware details for the hot-pluggable device, to create a firmware capsule payload based on the firmware details, and to store the firmware capsule payload in the memory. The host processor to operate in a pre-boot mode, and in an operating system runtime mode. The host processor, while in the operating system runtime, to retrieve the firmware capsule payload from the memory, to update a cached operating system ESRT based on the firmware capsule payload, to retrieve updated firmware for the hot-pluggable device, and to create the ESRT capsule based on the updated firmware.

20 Claims, 3 Drawing Sheets

(56) References Cited

U.S. PATENT DOCUMENTS

| | | | |
|---|---|---|---|
| 2014/0195763 A1* | 7/2014 | Rothman | G06F 8/65 711/166 |
| 2016/0179500 A1* | 6/2016 | Hsieh | G06F 8/654 713/2 |
| 2016/0231804 A1* | 8/2016 | Bulusu | G06F 1/3287 |

* cited by examiner

SYSTEM AND METHOD FOR RUNTIME UPDATE OF ESRT TABLE FOR HOT-PLUGGABLE DISKS

FIELD OF THE DISCLOSURE

This disclosure generally relates to information handling systems, and more particularly relates to updating an ESRT table for hot-pluggable disks at runtime.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

SUMMARY

An information handling system includes a memory, a remote access controller, and a host processor. The memory stores an extensible firmware interface (EFI) system resource table (ESRT) and an ESRT capsule. The remote access controller detects an insertion of a hot-pluggable device into the information handling system, retrieves firmware details for the hot-pluggable device, creates a firmware capsule payload based on the firmware details, and stores the firmware capsule payload in the memory. The host processor operates in a pre-boot mode, and in an operating system runtime mode. The host processor, while in the operating system runtime, retrieves the firmware capsule payload from the memory, updates a cached operating system ESRT based on the firmware capsule payload, retrieves updated firmware for the hot-pluggable device, and creates the ESRT capsule based on the updated firmware.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
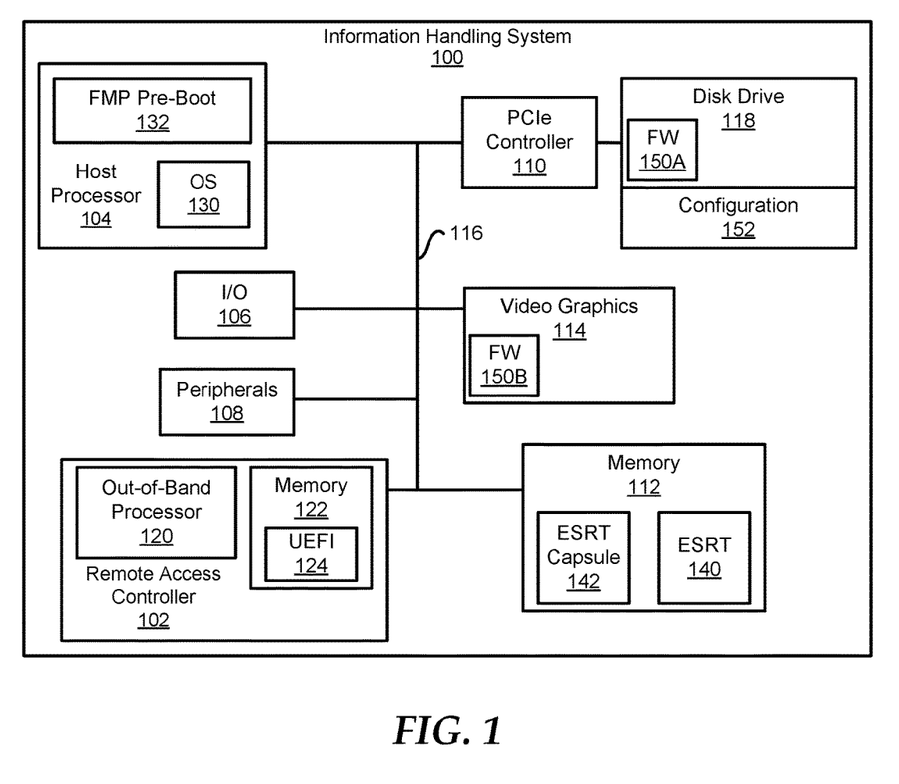
FIG. 1 is a block diagram of a virtual desktop environment including an information handling system and a data center in accordance with at least one embodiment of the present disclosure.

FIG. 1 illustrates an information handling system 100. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Information handling system 100, such as a server, a desktop personal computer, or the like, according to at least one embodiment of the present disclosure. The information handling system 100 includes a remote access controller 102, a host processor 104, an input/output module 106, peripherals 108, a peripheral component interconnect express (PCIe) controller 110, a memory 112, video/graphics hardware 114, and one or more buses or communication media 116. In an embodiment, the communication media 116, such as PCIe bus and other appropriate data buses such as memory bus, can provide a mechanism for the various components of the information handling system 100 to communicate and couple with one another, it is understood that communication media 116 may represent multiple buses that are each only coupled to some of the component devices as appropriate. The remote access controller 102 includes an out-of-band processor 120 and associated embedded non-volatile memory 122, such as a non-volatile random access memory (NVRAM). In an embodiment, the remote access controller 102 can be an integrated Dell Remote Access Controller (iDRAC), a baseboard management controller, or the like. Unified Extensible Firmware Interface (UEFI) code 124 including a UEFI configuration table may be stored on non-volatile memory such as memory 122 or other system non-volatile memory, such as a hard disk drive 118 (or disk drive 118), or the like. In an embodiment, the out-of-band processor 120 may be a service processor, embedded processor, or the like.

The host processor 104 is configured to run a host operating system (OS) 130, such as Windows-based OS, Linux-based OS, or the like, during in-band operation, and can be configured to run Firmware Management Protocol (FMP) based pre-boot code 132, such as Dell Life Cycle Controller, during out-of-band operation as needed. The I/O device 106, peripherals 108, the memory 112, and the video/graphics device 114 may have the structure, and perform the functions known to those of skill in the art. Besides memory 112, host processor 104 may include cache memory for storage of frequently accessed data, and disk drive 118 may include extended memory for host processor 104.

During a boot operation of the information handling system 100, the host processor 104 can execute the FMP based pre-boot code 132 to determine whether any firmware updates are available for any of the devices, such as the video/graphics device 114, and the disk drive 118, within the information handling system 100. The host processor 104 can employ an EFI System Resource Table (ESRT), shown in Table 1, to identify device and system resources that have updatable firmware. Each ESRT entry describes a resource that can be targeted by a firmware capsule update, and also lists a status of the last attempted update of that resource.

TABLE 1

ESRT Configuration Table

| Field | Array Value | Byte Length | Byte Offset | Description |
|---|---|---|---|---|
| Firmware Resource Count | | 4 | 0 | The number of firmware resource entries in the ESRT. Must not be zero. |
| Firmware Resource Maximum | | 4 | 4 | The maximum number of resource array entries that can be added without reallocating the table. Must be greater than or equal to Firmware Resource Count. |
| Firmware Resource Version | | 8 | 8 | The firmware resource entry version. This value should be set to 1. |
| Firmware Resource Entry Array | | | | Firmware Resource Entry 0 |
| | Firmware Class | 16 | 16 | A GUID that identifies a firmware component that can be updated via update capsule. This GUID will be passed into the UEFI update capsule run-time service as the update capsule header's CapsuleGuid parameter during update. |
| | Firmware Type | 4 | 32 | One of the following values that identifies the type of firmware resource:<br>0: Unknown<br>1: System firmware<br>2: Device firmware<br>3: UEFI driver |
| | Firmware Version | 4 | 36 | The current firmware version, where a larger number represents a newer release. The format of this value is not defined, but should incorporate version major and minor numbers. The recommended format is first word is major and second word is minor version numbers. |
| | Lowest Supported Firmware Version | 4 | 40 | The lowest firmware resource version to which a firmware resource can be rolled back for the given system/device. If a security related fix is available in this firmware version, then the least compatible version should be equal to the current firmware version. |
| | Capsule Flags | 4 | 44 | Flags that will be passed into the UEFI update capsule run-time service in bits 0-15 of the update capsule header's Flags field (the OS is responsible to configure bits 16-31 of Flags as defined by section 7.5.3 of the UEFI specification). |
| | Last Attempt Version | 4 | 48 | The last firmware version for which an update was attempted. This value uses the same format as Firmware Version. |
| | Last Attempt Status | 4 | 52 | One of the following values that describes the status of the last firmware update attempt:<br>0: Success<br>1: Unsuccessful<br>2: Insufficient resources<br>3: Incorrect version<br>4: Invalid image format<br>5: Authentication error<br>6: Power event - AC not connected<br>7: Power event - Insufficient battery |
| Firmware Resource Count . . . | | | | Firmware Resource Entry 1 |

In Table 1, the firmware resource count field indicates how many firmware resources entries for different devices are in the ESRT. For example, the ESRT above include a value of 4 in the firmware resource count field, such that there are currently four firmware resources entries in the ESRT. However, for brevity only firmware resource entry 0 is shown in detail, but one of ordinary skill in the art will recognize that the ESRT can continue for firmware resource entry 1, firmware resource entry 2, and firmware resource entry 3. Details for the other firmware information stored in the ESRT for each firmware resource entry is described in the description field of Table 1.

Conventional ESRT methodology can be used to update firmware for a newly inserted Peripheral Component interconnect Express (PCIe) hot-pluggable device in the following manner. After the new hot-pluggable PCIe device is inserted and coupled to the system PCIe bus, the system OS first reboots before proceeding further to allow the UEFI pre-boot firmware to detect the newly added hot-pluggable device, to identify which ESRT entry to be populated in the UEFI/ESRT configuration table, and then to create a mapping in the ESRT table for the new device. Then, a second OS reboot is required. At the second OS reboot following the new device insertion, the OS can detect that a newer firmware version is available for the device, and can then apply the firmware update after the required second reboot.

During OS 130 runtime in the host processor 104, the host processor 104 can execute an OS kernel driver 140 to store an ESRT capsule 142 within memory 112. The ESRT capsule 142 can be employed to stage updates for device firmware, such as device driver firmware in the form of option-read only memory (ROM) stored in non-volatile memory of a network adapter device for use during system OS boot. The device firmware makes a boot time decision whether to apply a given ESRT capsule 142, such as based on integrity checks or other platform parameters. The host processor 104 can utilize the FMP-based pre-boot code 132 that has been used to locate and identify existing and new versions of UEFI driver firmware for the device, and then to program an appropriate new device driver firmware image into non-volatile memory of the device via computer system memory, such as in a manner consistent with Chapter 32 of UEFI Specification 2.5. The UEFI/ESRT capsules may be used to update device firmware without requiring a full system firmware update.

In one embodiment, a ESRT capsule 142 may include one or more versions of operational drivers for updating firmware 150 of one or more FMP-based target devices on information handling system 100, such as disk drive 118 and/or other type of PCIe or non-PCIe target devices of an information handling system such as video/graphics controller 114, or other possible devices such as RAID controller, BIOS, complex programmable logic devices (CPLDs), or the like. Such PCIe or non-PCIe target devices may be hot-pluggable and have an embedded processing device that is configured to load a resident driver into system memory 112 and execute other firmware components from target device embedded memory While OS 130 is loaded and running on host processor 104, such as during OS runtime, the disk drive 118, which is supported by the OS 130, can be hot-plugged into the PCIe controller 110, such that the disk drive is communicatively coupled to the communication media 116. In this situation, the runtime hot plug insertion of the disk drive 118 can generate an interrupt for the processor 120 of the remote access controller 102. The processor 120 can then read the configuration details for the disk drive 118. In particular, the processor 120 can utilize a PCIe VDM message, such as "get disk firmware information( )" to read the device firmware version and other firmware information from configuration space 152 of the disk drive 118. In an embodiment, data in the configuration space 152 can include data to be utilized in the ESRT, shown in Table 1 including Firmware Version and other ESRT related firmware information, such as Last Support Firmware Version, Capsule Flags, Last Attempt version, Last Attempt status, or the like The processor 120 can also read additional attributes of the disk drive 118 when inserted or receive hot-pluggable device from the standard configuration space 152, such as Device ID, Vendor ID, or the like. The processor 120 can then create a capsule payload based on the firmware configuration data for the disk drive 118, and the processor can store the capsule payload in the memory 112.

The processor 120 can then provide an interrupt event to the host processor 104 operating in the OS 130. The interrupt event can cause an OS kernel driver of the host processor 104 to read the firmware details from the capsule payload stored in the memory 112. The host processor 104, via the OS kernel driver, can the update a cached OS ESRT configuration table with the firmware information for the disk drive 118 which is newly inserted. In an embodiment, the OS ESRT configuration table can be a cached copy of the ESRT configuration. For example, the cached OS ESRT configuration table can be accessed and updated by the host processor 104 during OS runtime, but the actual ESRT table 140 can only be accessed and updated by the FMP-based pre-boot 132 during a boot operation of the information handling system 100.

In response to the cached OS ESRT configuration table being updated, the host processor 104 can retrieve firmware updates for the hot pluggable disk drive 118 which is hot pluggable. The host processor 104 can then apply the firmware updates to the disk drive 118, and can update the OS ESRT configuration table. Thus, the disk drive 118 can begin operating in the information handling system 100 with the most updated firmware during the same runtime as when the disk drive is first inserted into the information handling system. The host processor 104, operating in the OS 130 runtime, can then create an ESRT capsule entry including the updated firmware information for the hot pluggable disk 118. The host processor 104 can store the ESRT capsule 142 in the ESRT capsule storage location 412 of the memory 112 that is accessible by the OS 130 during runtime and accessible by the FMP based pre-boot code 132 during start up of the information handling system 100.

During the next boot operation of the information handling system 100, the FMP based pre-boot code 132 can consume the capsule entry for the disk drive 118 which is hot pluggable in the ESRT capsule storage location 142 is consumed by the UEFI firmware. The FMP pre-boot UEFI firmware 132 can update the UEFI/ESRT configuration table with the firmware updates from the capsule, and can determine whether any additional firmware updates are available for the disk drive 118, which is hot pluggable. Thus, the remote access controller 102 and the host processor 104 can combine to update the firmware for the disk drive during OS runtime, and the host processor can then create an ESRT capsule that can be consumed by the FMP pre-boot code 132 during the next re-boot of the information handling system 100.

Figure 2:
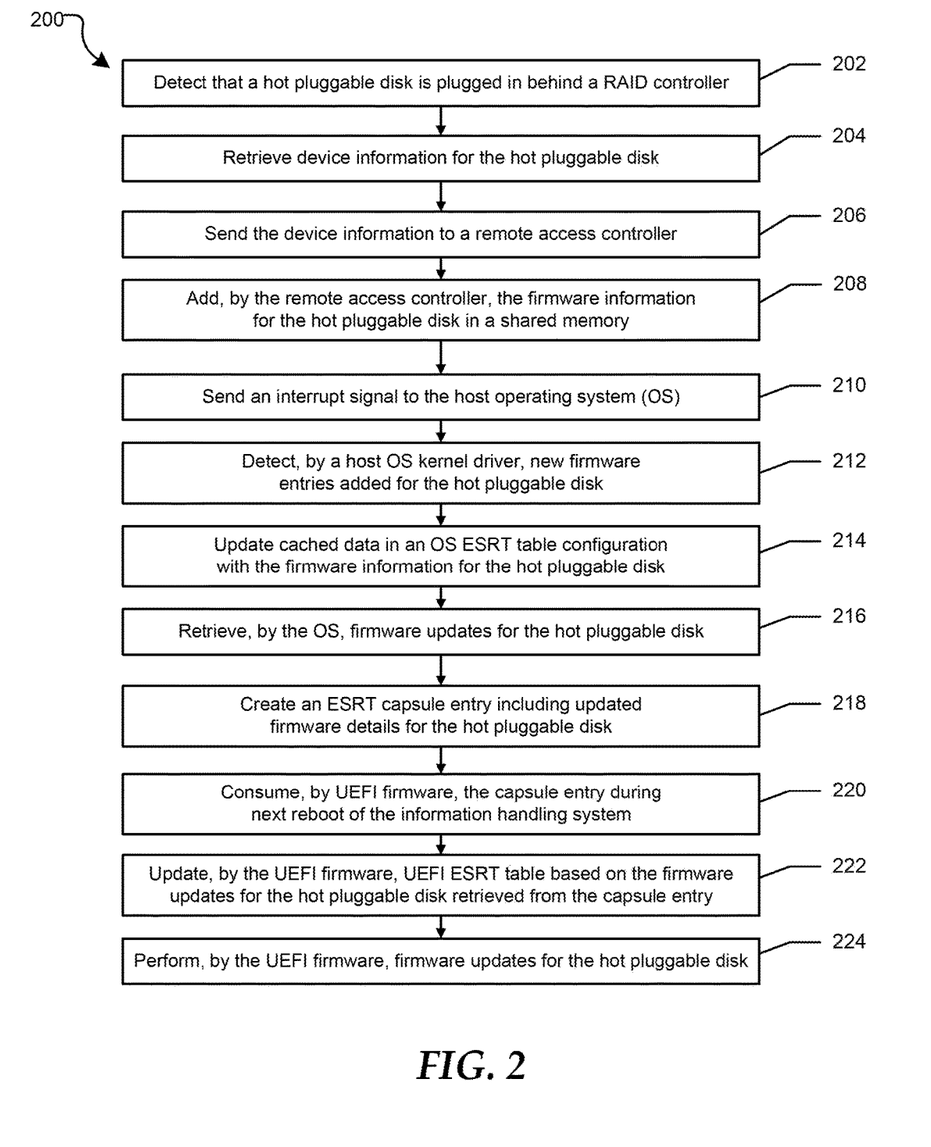
FIG. 2 is a flow diagram of a method for performing operating system runtime firmware updates of a hot pluggable disk in accordance with at least one embodiment of the present disclosure.

FIG. 2 is a flow diagram of a method 200 for performing operating system runtime firmware updates of a hot pluggable disk in accordance with at least one embodiment of the present disclosure. At block 202, a hot pluggable disk detected as being plugged into a redundant array of independent disk (RAID) controller of an information handling system. In an embodiment the RAID controller can be a PCIe controller. In an embodiment, the hot pluggable disk can be a SAS disk drive, a SATA disk driver, or any other type of non-PCIe disk drives. At block 204, the RAID controller retrieves device information for the hot pluggable disk. In an embodiment, the device information can include current firmware information for the hot pluggable disk.

At block 206, the device information is sent to a remote access controller of the information handling system. In an embodiment, the remote access controller can be baseboard management controller, an integrated Dell Remote Access Controller (iDRAC), or the like. In an embodiment, the device information can be sent to the remote access controller in response to a VDM message, such as a 'get disk firmware information' message. In response to receiving the firmware information for the hot pluggable, the firmware information for hot pluggable disk is added to a shared memory by the remote access controller at block 208. At block 210, an interrupt signal is sent to a host OS. In response to the interrupt signal, new firmware entries added for the hot pluggable disk are detected by a host OS kernel driver at block 212.

At block 214, a cached OS ESRT table configuration is updated with the firmware information. At block 216, the OS retrieves, during runtime, firmware updates for the hot pluggable disk. An ESRT capsule entry is created including the updated firmware information for the hot pluggable disk at block 218. In an embodiment, the ESRT capsule can be stored in a memory that is accessible by the OS during runtime and accessible by UEFI firmware during start up of the information handling system. At block 220, the capsule entry is consumed by the UEFI firmware during a next reboot of the information handling system. An UEFI ESRT table is updated with the firmware updates from the capsule during the next reboot at block 222. At block 224, firmware updates for the hot pluggable disk are performed by the UEFI firmware.

Figure 3:
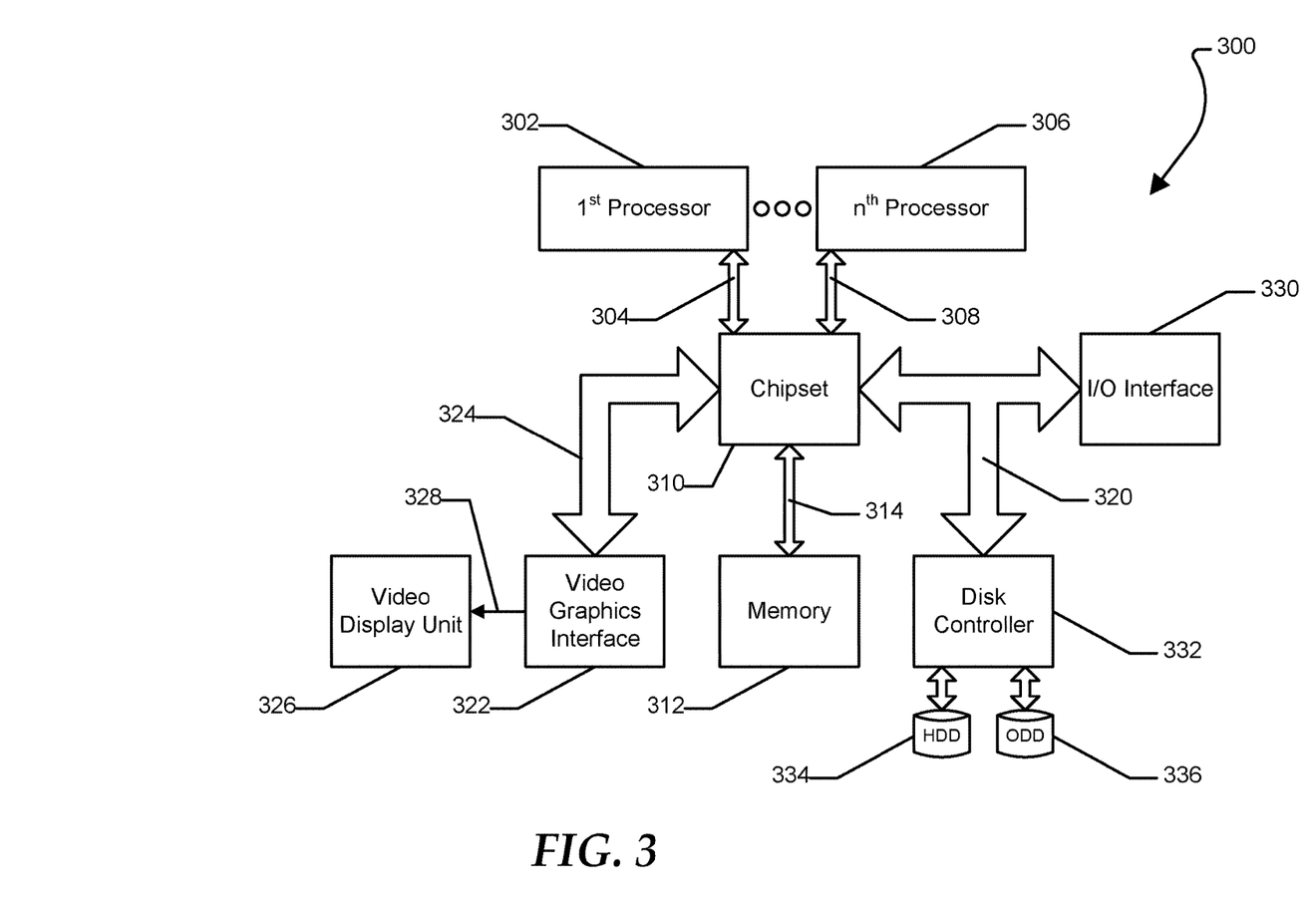
FIG. 3 is a block diagram of a general information handling system.

As shown in FIG. 3, an information handling system 300, such as the information handling system 100, can include a first physical processor 302 coupled to a first host bus 304 and can further include additional processors generally designated as $n^{th}$ physical processor 306 coupled to a second host bus 308. The first physical processor 302 can be coupled to a chipset 310 via the first host bus 304. Further, the $n^{th}$ physical processor 306 can be coupled to the chipset 310 via the second host bus 308. The chipset 310 can support multiple processors and can allow for simultaneous processing of multiple processors and support the exchange of information within information handling system 300 during multiple processing operations.

According to one aspect, the chipset 310 can be referred to as a memory hub or a memory controller. For example, the chipset 310 can include an Accelerated Hub Architecture (AHA) that uses a dedicated bus to transfer data between first physical processor 302 and the $n^{th}$ physical processor 306. For example, the chipset 310, including an AHA enabled-chipset, can include a memory controller hub and an input/output (I/O) controller hub. As a memory controller hub, the chipset 310 can function to provide access to first physical processor 302 using first bus 304 and $n^{th}$ physical processor 306 using the second host bus 308. The chipset 310 can also provide a memory interface for accessing memory 312 using a memory bus 314. In a particular embodiment, the buses 304, 308, and 314 can be individual buses or part of the same bus. The chipset 310 can also provide bus control and can handle transfers between the buses 304, 308, and 314.

According to another aspect, the chipset 310 can be generally considered an application specific chipset that provides connectivity to various buses, and integrates other system functions. For example, the chipset 310 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 310. The chipset 310 can also be packaged as an application specific integrated circuit (ASIC).

The information handling system 300 can also include a video graphics interface 322 that can be coupled to the chipset 310 using a third host bus 324. In one form, the video graphics interface 322 can be an Accelerated Graphics Port (AGP) interface to display content within a video display unit 326. Other graphics interfaces may also be used. The video graphics interface 322 can provide a video display output 328 to the video display unit 326. The video display unit 326 can include one or more types of video displays such as a flat panel display (FPD) or other type of display device.

The information handling system 300 can also include an I/O interface 330 that can be connected via an I/O bus 320 to the chipset 310. The I/O interface 330 and I/O bus 320 can include industry standard buses or proprietary buses and respective interfaces or controllers. For example, the I/O bus 320 can also include a Peripheral Component Interconnect (PCI) bus or a high speed PCI-Express bus. In one embodiment, a PCI bus can be operated at approximately 33 MHz and a PCI-Express bus can be operated at more than one speed, such as 2.5 GHz, 5 GHz, 8 GHz, and 16 GHz. PCI buses and PCI-Express buses can be provided to comply with industry standards for connecting and communicating between various PCI-enabled hardware devices. Other buses can also be provided in association with, or independent of, the I/O bus 320 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 310 can be a chipset employing a Northbridge/Southbridge chipset configuration (not illustrated). For example, a Northbridge portion of the chipset 310 can communicate with the first physical processor 302 and can control interaction with the memory 312, the I/O bus 320 that can be operable as a PCI bus, and activities for the video graphics interface 322. The Northbridge portion can also communicate with the first physical processor 302 using first bus 304 and the second bus 308 coupled to the $n^{th}$ physical processor 306. The chipset 310 can also include a Southbridge portion (not illustrated) of the chipset 310 and can handle I/O functions of the chipset 310. The Southbridge portion can manage the basic forms of I/O such as Universal Serial Bus (USB), serial I/O, audio outputs, Integrated Drive Electronics (IDE), and ISA I/O for the information handling system 300.

The information handling system 300 can further include a disk controller 332 coupled to the I/O bus 320, and connecting one or more internal disk drives such as a hard disk drive (HDD) 334 and an optical disk drive (ODD) 336 such as a Read/Write Compact Disk (R/W CD), a Read/

Write Digital Video Disk (R/W DVD), a Read/Write mini-Digital Video Disk (R/W mini-DVD), or other type of optical disk drive.

Although only a few exemplary embodiments have been described in detail in the exemplary embodiments without materially departing from the novel teachings and advantages of the embodiments of the present disclosure. For example, the methods described in the present disclosure can be stored as instructions in a computer readable medium to cause a processor, such as chipset 310, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a memory to store an extensible firmware interface (EFI) system resource table (ESRT) and an ESRT capsule;
   a remote access controller to communicate with the memory, the remote access controller to detect a runtime insertion of a hot-pluggable device into the information handling system, to retrieve firmware details for the hot-pluggable device, wherein the firmware details include firmware configuration data, to create a firmware capsule payload based on the firmware details, to store the firmware capsule payload in the memory, wherein the memory is accessible by a host processor in an operating system runtime mode and in a pre-boot mode, and to provide an interrupt to the host processor;
   the host processor to communicate with the memory, the host processor operable in the pre-boot mode and in the operating system runtime mode, in response to the interrupt, the host processor while in the operating system runtime mode to retrieve the firmware capsule payload from the memory, to update a cached operating system ESRT based on the firmware capsule payload, to retrieve updated firmware for the hot-pluggable device, to create the ESRT capsule based on the updated firmware, to consume the ESRT capsule, to retrieve updates for the hot-pluggable device, and to apply the updates to the hot-pluggable device; and
   the hot-pluggable device operating with the updates in the information handling system during the operating system runtime mode.

2. The information handling system of claim 1, wherein while in the pre-boot mode, the host processor to consume the ESRT capsule, and to update the ESRT with data from the ESRT capsule.

3. The information handling system of claim 1 wherein the host processor, while in the operating system runtime mode, to receive the interrupt from the remote access controller prior to retrieving the firmware capsule payload from the memory.

4. The information handling system of claim 1, wherein the cached operating system ESRT is a copy of the ESRT, and the cached operating system ESRT is accessible by the host processor while operating in the operating system runtime mode.

5. The information handling system of claim 4 wherein the ESRT is only accessible by the host processor during the pre-boot mode.

6. The information handling system of claim 1 wherein the pre-boot mode is executed based on a firmware management protocol.

7. The information handling system of claim 1 wherein the hot-pluggable device is a non-peripheral component interconnect express (PCIe) device.

8. A method comprising:
   during an operating system runtime mode of a host processor:
      detecting, by a remote access controller, runtime insertion of a hot-pluggable device into an information handling system;
      providing an interrupt to the host processor;
      retrieving, in response to the interrupt, firmware details for the hot-pluggable device wherein the firmware details include firmware configuration data;
      creating a firmware capsule payload based on the firmware details;
      storing the firmware capsule payload in a memory, wherein the memory is accessible by the host processor in the operating system runtime mode and in a pre-boot operation mode;
      retrieving, by the host processor, the firmware capsule payload from the memory, the host processor to operate in the operating system runtime mode and in the pre-boot operation mode;
      updating a cached operating system ESRT based on the firmware capsule payload;
      retrieving updated firmware for the hot-pluggable device;
      creating an ESRT capsule based on the updated firmware;
      retrieving updates for the hot-pluggable device;
      applying the updates to the hot-pluggable device; and
      operating the hot-pluggable device N the updates during the operating system runtime mode.

9. The method of claim 8, while the host processor is operating in the pre-boot operation mode, the method further comprising:
   consuming, at the host processor, the ESRT capsule.

10. The method of claim 8, while in the operating system runtime mode further comprising:
    receiving the interrupt from the remote access controller prior to retrieving the firmware capsule payload from the memory.

11. The method of claim 8, wherein the cached operating system ESRT is a copy of the ESRT capsule, and the cached operating system ESRT is accessible by the host processor while operating in the operating system runtime mode.

12. The method of claim 11, wherein the ESRT capsule is only accessible by the host processor during the pre-boot operation mode.

13. The method of claim 8, wherein the pre-boot operation mode is executed based on a firmware management protocol.

14. The method of claim 8 wherein the hot-pluggable device is a non-peripheral component interconnect express (PCIe) device.

15. A method comprising:
    operating a host processor in an operating system runtime mode and in a pre-boot mode;
    while the host processor is operating in the operating system runtime mode:
       retrieving firmware details for a hot-pluggable device inserted at runtime into an information handling system, wherein the firmware details include firmware configuration data;

creating a firmware capsule payload based on the firmware details;

storing the firmware capsule payload in a memory, wherein the memory is accessible by the host processor in the operating system runtime mode and in a pre-boot operation mode;

providing an interrupt to the host processor, retrieving by the host processor in response to the interrupt, the firmware capsule payload;

updating the hot-pluggable device and a cached operating system ESRT based on the firmware capsule payload;

operating the updated hot-plug able device with updates during the operating system runtime mode;

retrieving updated firmware for the hot-pluggable device; and creating an ESRT capsule based on the updated firmware; and while the host processor is operating in the pre-boot mode;

consuming, at the host processor, the ESRT capsule;

updating, by the host processor, an ESRT with data from the ESRT capsule;

retrieving the updates for the hot-pluggable device; and applying the updates to the hot-pluggable device.

16. The method of claim 15, while in the operating system runtime mode further comprising:

receiving the interrupt from a remote access controller prior to retrieving the firmware capsule payload from the memory.

17. The method of claim 15, wherein the cached operating system ESRT is a copy of the ESRT, and the cached operating system ESRT is accessible by the host processor while operating in the operating system runtime mode.

18. The method of claim 17, wherein the ESRT is only accessible by the host processor during the pre-boot mode.

19. The method of claim 15 wherein the pre-boot mode is executed based on a firmware management protocol.

20. The method of claim 15 wherein the hot-pluggable device is a non-peripheral component interconnect express (PCIe) device.

* * * * *

UNITED STATES PATENT AND TRADEMARK OFFICE
CERTIFICATE OF CORRECTION

PATENT NO. : 10,423,425 B2
APPLICATION NO. : 15/180521
DATED : September 24, 2019
INVENTOR(S) : Sumanth Vidyadhara et al.

Page 1 of 1

It is certified that error appears in the above-identified patent and that said Letters Patent is hereby corrected as shown below:

In the Claims

Column 10, Line 35: Please change "N" to --with--

Column 11, Line 13: Please change "hot-plug able" to --hot-pluggable--

Signed and Sealed this
Seventeenth Day of March, 2020

Andrei Iancu
*Director of the United States Patent and Trademark Office*